UNITED STATES PATENT OFFICE.

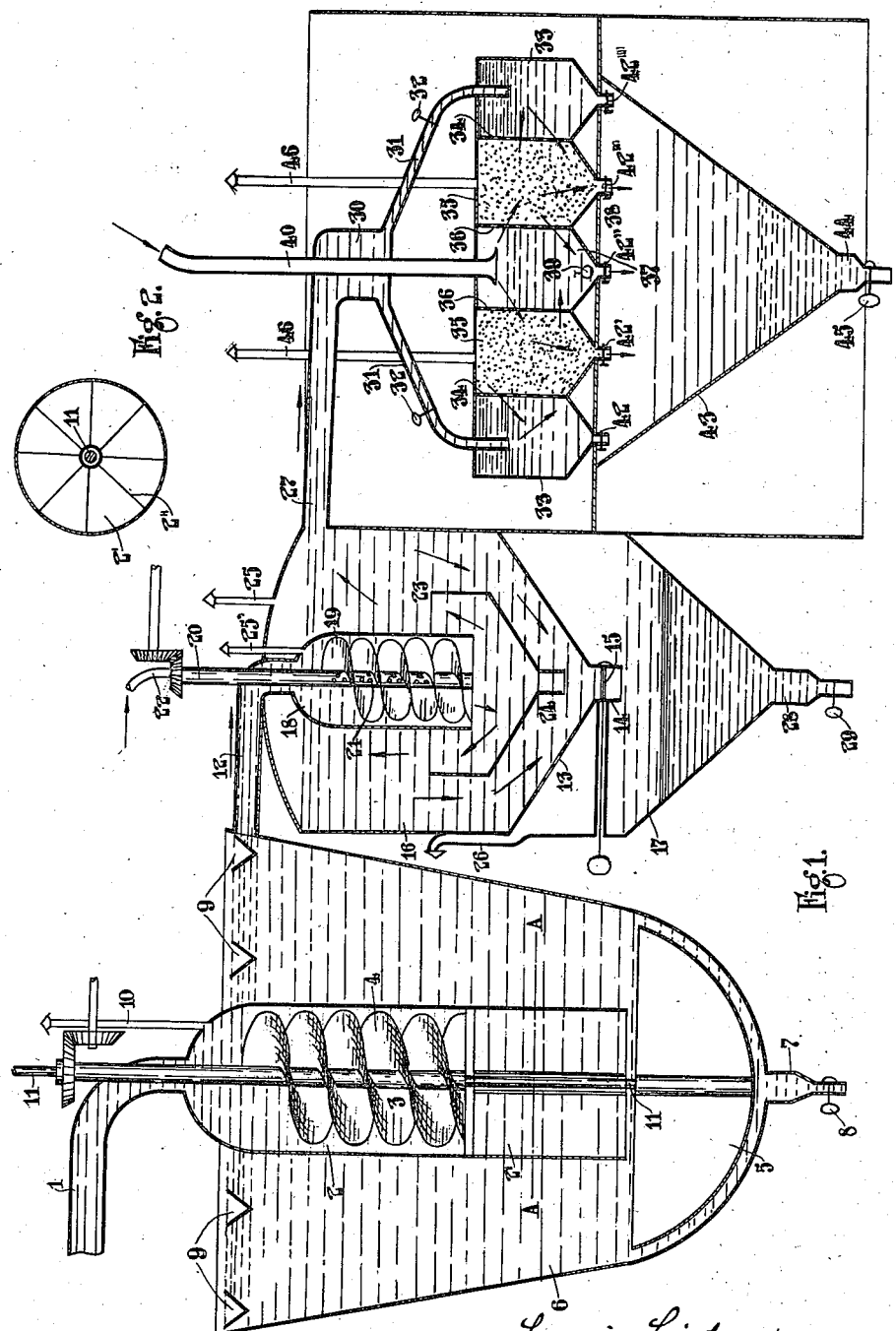

LUCIEN LINDEN, OF PUTNEY, LONDON, ENGLAND, ASSIGNOR TO WILLIAM J. STEWART, OF BELFAST, IRELAND.

APPARATUS FOR PURIFYING WATER.

1,276,234.     Specification of Letters Patent.      Patented Aug. 20, 1918.

Application filed July 9, 1915. Serial No. 39,030.

*To all whom it may concern:*

Be it known that I, LUCIEN LINDEN, a subject of the King of the Belgians, and residing at 1 Gwendolen Avenue, Putney, London, S.W., England, have invented certain new and useful Apparatus for Purifying Water, of which the following is a specification.

This invention relates to improvements in processes of the character set forth in my British Patents Numbers 16239 of 1907, 16725 of 1908, and 9258 of 1911 and embodied in a water purifying plant of the character described in the *Bulletin de l'Association des Ingenieurs sortis de l'Ecole de Liege,* vol. 37, 1913, number 6, page 362.

The object of the invention is to provide processes and apparatus in several respects of increased economy.

The invention broadly consists in bringing the liquid to be purified into the decanter itself while undergoing vigorous admixture with a precipitant and already formed precipitate and promptly stilling the liquid so as to secure the benefit of the tendency to rapid deposition which I have found precipitating matters to display in a suddenly stilled mass of liquid and thus *inter alia* to reduce the amount of precipitant needed.

In the preferred embodiments of the invention a similar method is adopted in the stage dealing with elimination of excess precipitant the desired effect being conveniently secured by providing spiral agitators within delivery bells open below and submerged in the decanters.

The invention also consists in the improved method of purifying water and apparatus therefor in which liming and carbonation are effected as indicated and the water is finally filtered through filters preferably of a type cleansed by reverse flow.

This invention also consists in the improvements in and relating to water purifying methods as set out in my British Patent No. 1266 of 1914 which are hereinafter indicated.

The invention further consists in improved methods of and apparatus for treating water as hereinafter described.

This process is characterized by the fact that the water mixed with suitable reagents such as milk of lime, lime water or the like while in continuous circulation, is subjected from the beginning to a violent agitation preferably to a gyratory motion, for the purpose of effecting an intimate mixture of water and the milk of lime and thus bringing the lime into contact with all the molecules of the water to be purified, the agitation, that is to say, the gyratory motion of the mixture having also for its object to effect sterilization conjointly with the lime of the water in a mechanical manner.

The water thus agitated and then stilled becomes rapidly separated from the solid matters which it holds in suspension. It is then subjected to the action of carbonic acid, while receiving again a gyratory motion for the purpose of freeing it as rapidly as possible from the carbonate of lime that has been formed, after which the purified softened water flows through a suitable filter preferably of the reversible current type, from which it passes out in a limpid and softened state and a perfectly wholesome condition.

This process may be carried into effect in an apparatus divided into three distinct parts: In the first part there is effected the intimate liming of the water to be purified by means of an energetic and prolonged stirring and agitation with means for collecting precipitate. In the second part of the apparatus which receives the water from the first part the water is subjected to carbonation by means of a second energetic stirring, the resulting deposits of carbonate of lime being collected at the bottom of this said second part, while the water which is still more or less milky passes into the third part of the apparatus which is constituted by a filter preferably of the reversible current type, below which there is a collector which serves to receive the matters expelled from the filters. The water passes out in a limpid state, free from lime, softened and perfectly wholesome from this third part of the apparatus.

In order to complete the softening of the water the latter may be subjected to a second carbonating operation in a following apparatus similar to the first one.

Figure 1 of the accompanying drawing illustrates by way of example in longitudinal section a constructional form of the apparatus according to the present invention, and Fig. 2 is a fragmental section on the line A—A of Fig. 1.

The water admixed with suitable reagents, for example, milk of lime or lime water, in flowing down passes through a pipe 1 into a compartment 2 consisting of a vertical cylinder open at its lower end. In the axis of this cylinder there revolves a vertical hollow shaft 3 which carries a stirrer 4 which may be formed like an Archimedean screw inside the cylinder. This stirrer is so formed as to subject the water to vigorous agitation, and yet not to impart any undue forward motion to the mass of water which motion should be able to take place more or less under the influence of head alone. This result may be secured by forming the spiral of balanced or practically balanced sections of opposite hand.

Rotary motion may be taken out of the mass in the lower portion of the cylinder 2 by a section 2' containing radial baffles 2" so as to divide it into cells (see Fig. 2) through which the water flows. Concentrically within but independently of the shaft bearing the spiral is a second shaft 11 bearing at its lower end a paddle or vane 5 adapted on being slowly rotated at intervals to level out and equalize the deposit in the base of the decanter.

The vessel 6 has preferably a conical shape with spherical bottom as shown in the drawing. In the center of the bottom of this vessel there is an outlet pipe 7 provided with a valve 8, while at the upper part of the vessel there are channels 9 for the discharge of the water. The cylinder 2 is provided with a ventilating or aerating chimney 10. The stirrer 4 receives a rapid rotary motion from any suitable driving gearing, while the lower vane 5 receives suitable rotary motion, either continuously or intermittently, by means of the shaft 11 which may be connected above to the shaft 3 through suitable rduction and clutch gear. The deposits of solid matters descend toward the bottom of the vessel 6, while the water freed from those matters rises and overflows into the channels 9, then discharges from the pipe 12 into the second vessel of the apparatus wherein the limed water is carbonated.

The second vessel is divided by a conical bottom 13 provided with a pipe 14 with a sluice valve 15 into two superposed compartments 16 and 17. In the axis of the upper compartment 16 there is situated a vertical cylinder 18 in which revolves a stirrer 19 preferably similar to that last described, carried by a hollow shaft 20, preferably pierced with holes 21 through which carbonic acid passes out under pressure supplied through a pipe 22 in or under the hollow shaft 20.

The lower open end of the cylinder 18 dips in a funnel 23 having a lower open pipe neck 24 separated from the bottom 13 by a suitable space. The cylinder 18 is surmounted by a chimney 25' for the discharge of the carbonic acid gas which rises owing to its low density. The upper compartment 16 is provided with an aerating or ventilating chimney 25, while the lower compartment 17 has an aerating or ventilating chimney 26. The limed water which has been carbonated by energetic stirring in the cylinder 18 descends into the funnel 23 and rises again toward the outlet 27 while the carbonate of lime passes down through the pipe 24 and the space separating the funnel 23 from the bottom 13 on to the latter. The deposits of carbonate of lime are removed from time to time through the sluice valve 15 into the lower compartment 17 that constitutes a decanter. In this decanter the water which is always at rest separates from the carbonate of lime which deposits on the bottom and can be removed from time to time through the pipe 28 that is fitted with a sluice valve 29. The supernatant water may be pumped back into the first vessel 6 or discharged at will.

The water issuing from the compartment 16 through the pipe 27 enters a distributing box 30 whence two or more pipes 31 extend, each provided with a regulating tap 32 and discharging into a compartment 33. Each compartment 33 is separated by a perforated plate 34 from a second compartment 35 filled with filtering materials and separated by a perforated plate 36 or its equivalent from a central compartment 37. To the lower part of the latter there is connected a pipe 38 fitted with a sluice valve 39 for the discharge of the filtered water, while into the upper part of the central compartment 37 there opens a pipe 40 for supplying water under pressure for the purpose of washing and cleaning the filters. Each of these compartments 33, 35 and 37 is provided with a lower pipe fitted with a sluice valve 42, 42', 42", 42'" and 42"", which opens into a lower decanter 43 provided with an exit pipe 44 fitted with a sluice valve 45. The filters 35 are provided with an aerating chimney 46. The water arriving through the pipes 31 passes through the filters 35 and leaves through the pipe 38.

For the purpose of cleaning the filters from time to time the taps 32 are closed, the pipes 42 and 42"" are opened and water under pressure is admitted through the pipe 40. This water then flows through the pipes in the reverse direction and carries away with it the substances which are soiling the filters. These substances together with the water pass down into the decanting vessel 43 whence after the solid substances have been deposited, the supernatant water can then be discharged or pumped back into the first vessel 6. The pipes 42', 42" and 42'"

serve for emptying the other compartments of the filters in case of necessity.

The above described apparatus operates as follows:—

The water mixed with lime descending in the first apparatus 6, and continuously circulating, is first stirred in an energetic and prolonged manner in the vertical cylinder 2 which communicates through the stilling section 2' at its lower end with the interior of the vessel 6. Owing to this stirring all the molecules of the milk of lime are brought into intimate contact with all the molecules of the water. This allows of effecting on the one hand a large saving in lime, and on the other hand an active and more rapid precipitation of the impurities contained in the water. The energetic and prolonged stirring of the water has in addition the effect of aiding the sterilization of the water by a mechanical action. The substances precipitated by the lime are rapidly deposited on the bottom of the vessel 6 whence after being raked together by means of the vane 5 they may be discharged from time to time through the sluice valve 8. The water which has been limed and which has been freed from the precipitated substances rises around the cylinder 2 and passes away through the channels 9 and the pipe 12 into the second carbonating vessel, wherein it is subjected to a second energetic stirring inside the cylinder 18 into which carbonic acid is injected under pressure preferably through holes 21 of the hollow shaft 20 which carries the stirring screw 19. The water mixed with carbonate of lime separates to a large extent from the latter in descending in the funnel 23 and then rises again toward the exit pipe 27, becoming more and more free from this carbonate of lime in passing above the space which separates the funnel 23 from the bottom 13 and the vertical walls of the compartment 16 in which space there exists a relative calm. The precipitated carbonate of lime descends through the pipe 24 and the space referred to on to the bottom 13 and is received from time to time in the lower decanter 17 through the opening of the sluice valve 15. The water which separates from the solid substances in this decanter may be discharged into the reservoirs or pumped back into the first vessel 6, while the solid substances are discharged from time to time through the sluice valve 29.

Where it is desired to soften the water nearly completely or so, the said water is subjected to a second carbonating operation in an apparatus which is preferably similar to the one just described in combination with filtration introduced between the two carbonating processes.

The water may also be oxidized and be cooled when it is thought advisable by adding an additional basin in front of the filters, constructed like the carbonating basin, but instead of carbonic acid, air purified and cooled by known means will be blown in. In the same way in certain cases gases or acids adapted for the purpose in view may be added.

The water passing out of the carbonating vessel through the pipe 27 flows through the pipe 31 (the controlling taps 32 in which allow of regulating the pressure of the water at will) into the compartments 33 and it passes through the filters 35 toward the central compartment 37. The filtered water which is perfectly limpid and completely freed from lime is discharged through the pipe 38. The cleaning of the filters 35 is effected from time to time by causing water under pressure to enter from the pipe 40 after having closed the taps 32 and the sluice valve 39 and opened the sluice valves of the pipes 42 and 42''''. This water under pressure being admitted into the central compartment 37 then passes through the filters in the reverse direction and carries away with it the substances which soil those filters in the lower decanter 43 where the water becomes separated afresh from the substances carried along by it. The water situated above those substances may be utilized as it is or be pumped back again into the first vessel 6, while the solid substances may be discharged from time to time through the sluice valve 45.

The filters for separating out the carbonate of lime irrespectively of the material of which they are composed, which finish off the operations of clarifying the water to crystal clearness, are liable to become very easily contaminated and to become actual foci of microbic life if they are not sterilized in good time. An excellent means of sterilizing them without disturbing the filtering materials is to introduce when necessary (generally once a week) in a suitable manner a jet of steam into the water in the filters while they are at rest. By this means the water is easily brought into ebullition during the time (about 20 to 30 minutes) that is necessary for completely sterilizing the filters.

Before this operation care must be taken to close the inlet and outlet valves for the water allowing only the overflows to act in case of necessity. Practical considerations will require that the filters should be made of the smallest dimensions in order to facilitate this very simple operation.

In carrying out the treatment of liquids according to my Patent No. 1266 of 1914, it is also convenient to provide a movable arm in the bottom of the earlier decanter or filter, the arm being borne by a shaft extending vertically through the decanter and connected to gear permitting the arm to be swept at intervals, as desired, over the bottom of the decanter to equalize the deposits on the bottom and permit of the sterilizing agent, if any is used, becoming well mixed in with the sludge. The shaft may at its upper part within the bell of the decanter carry horizontal baffles or plates intercalated between similar plates on the walls of the bell so as to insure the liquid supplied to the bell trickling over the baffles and becoming well mixed with reagent which is introduced at this point. Likewise baffles may be disposed in a louvred tower adapted to receive the liquid leaving the last decanter and cause it to flow as a thin stream through a current of air rising in the tower and acting to aerate the water and increase its palatability.

It is to be understood that the constructional details of the apparatus hereinbefore described and illustrated in the accompanying drawings may vary as described and according to the requirements of each particular case according as it is a question of purifying drinking water, sewage, softening waters, or purifying waste liquors of industrial operations without departing in any way from the nature of the invention.

It has been proved by my experiences that raw river water, impounded waters, reservoirs or the like which, after the use of lime, retained a disagreeable taste or smell, mud, fish or other substance, could be easily deodorized by the use of two to five grams, more or less, of hypochlorite of lime or soda, admixed preferably to the water at the beginning of the operations. It is then completely eliminated from the water by the various operations required for purifying the water and no trace of it remains on leaving the apparatus.

Having now described my invention, what I claim as new and desire to secure by Letters Patent is:—

1. In combination in apparatus for purifying liquids, an open topped vessel, a tubular member open at the bottom positioned vertically therein and extending from the top to near the bottom thereof, a conduit conveying a liquid already mixed with a precipitant to the top of said member, means for producing vigorous turbulence of the liquid moving down the upper portion of said member and means for rapidly stilling said turbulence at the lower part of said member to transfer the liquid therefrom to said vessel in a state of slow uniform upward motion.

2. In combination in apparatus for purifying liquids an open topped vessel, a tubular member open at the bottom positioned vertically therein, a converging cover to said member, a conduit connected to the apex of said cover and conveying a liquid already mixed with a precipitant to the top of said member, means for vigorously agitating said liquid through the prior stages of its downward passage through said member, means for quelling the disturbance as the liquid enters the bottom of said vessel from said member and means for collecting and removing the precipitate deposited at the bottom of said vessel.

3. In combination in apparatus for purifying liquids, a decanting vessel, a concentric basin forming the bottom thereof, a depending conduit for conveying a liquid in admixture with a precipitant downward into said basin, mechanical means for vigorously agitating said liquid in its passage in said conduit, means for stilling the liquid as it emerges from said conduit and moving means for collecting the precipitate thrown upon said basin.

4. In combination in apparatus for purifying liquids, an open topped vessel, a tubular member open at the bottom positioned vertically therein and extending from the top to near the bottom thereof, a conduit conveying a liquid already mixed with a precipitant to the top of said member, means for producing vigorous turbulence of the liquid moving down the upper portion of said member, means for rapidly stilling said turbulence at the lower part of said member and means for eliminating all foreign matter from said liquid.

5. In combination in apparatus for purifying liquids, an open topped vessel, a tubular member open at the bottom positioned vertically therein and extending from the top to near the bottom thereof, a conduit conveying a liquid already mixed with a precipitant to the top of said member, means for producing vigorous turbulence of the liquid moving down the upper portion of said member, means for rapidly stilling said turbulence at the lower part of said member, means for facilitating the deposition of all foreign matter from said liquid and means for removing said matter as deposited.

6. In combination in apparatus for purifying liquids a decanting vessel, a concentric basin forming the bottom thereof, means for conveying a liquid in admixture with a precipitant downward into said basin, mechanical means for vigorously agitating said liquid in its passage, an arm or arms conforming to the contour of said basin and means apart from said mechanical means for moving the arm or arms to sweep over the bottom of the vessel and rake together the material thereon.

In testimony whereof I have signed my name to this specification.

LUCIEN LINDEN.